(12) United States Patent
Liang et al.

(10) Patent No.: US 11,985,088 B2
(45) Date of Patent: May 14, 2024

(54) GENERATING SEQUENCES FOR REFERENCE SIGNALS

(71) Applicant: ZTE Corporation, Guangdong (CN)

(72) Inventors: Chunli Liang, Guangdong (CN); Chuangxin Jiang, Guangdong (CN); Zhisong Zuo, Guangdong (CN); Shuqiang Xia, Guangdong (CN); Peng Hao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 501 days.

(21) Appl. No.: 17/245,708

(22) Filed: Apr. 30, 2021

(65) Prior Publication Data

US 2021/0258197 A1 Aug. 19, 2021

Related U.S. Application Data

(63) Continuation of application No. PCT/CN2018/113829, filed on Nov. 2, 2018.

(51) Int. Cl.
*H04L 5/00* (2006.01)
*H04L 27/20* (2006.01)
*H04L 27/26* (2006.01)

(52) U.S. Cl.
CPC .......... *H04L 5/0051* (2013.01); *H04L 5/0048* (2013.01); *H04L 27/20* (2013.01); *H04L 27/2613* (2013.01); *H04L 27/262* (2013.01)

(58) Field of Classification Search
CPC ..... H04L 5/0051; H04L 5/0048; H04L 27/20; H04L 27/2613; H04L 27/262; H04L 27/2614

(Continued)

(56) References Cited

U.S. PATENT DOCUMENTS

2014/0286271 A1 9/2014 Kim et al.
2016/0164581 A1 6/2016 Kim et al.
(Continued)

FOREIGN PATENT DOCUMENTS

CN 102026219 A 4/2011
CN 102224719 A 10/2011
(Continued)

OTHER PUBLICATIONS

Extended European Search Report dated May 16, 2022 for European Patent Application No. 18929905.0 (7 pages).

(Continued)

*Primary Examiner* — Rownak Islam
(74) *Attorney, Agent, or Firm* — Perkins Coie LLP (57) ABSTRACT

Methods, systems, and devices for generating sequences for reference signals in mobile communication technology are described. An exemplary method for wireless communication includes transmitting data, which is modulated using a pi/2-binary phase shift keying (BPSK) modulation, and a reference signal using a plurality of subcarriers, where the reference signal comprises a sequence from a subset of sequences that contains 30 sequences, each with a predetermined length, and where the subset of sequences include at least a first number of fixed sequences and a second number of selected sequences. The method further enables constructing the sequences, which have low peak-to-average power ratio (PAPR) properties, for sequence lengths N=6, 12, 18, 24 and 30.

19 Claims, 3 Drawing Sheets

200

Transmitting data, which is modulated using a pi/2-binary phase shift keying (BPSK) modulation, and a reference signal, which comprises a sequence from a subset of sequences of size 30, using a plurality of subcarriers — 210

(58) Field of Classification Search
USPC .......................................................... 370/329
See application file for complete search history.

(56) References Cited

U.S. PATENT DOCUMENTS

| | | | |
|---|---|---|---|
| 2017/0201989 A1 | 7/2017 | Fakoorian et al. | |
| 2017/0230156 A1 | 8/2017 | Fakoorian et al. | |
| 2019/0158339 A1* | 5/2019 | Park | H04L 27/3411 |
| 2020/0021414 A1* | 1/2020 | Ding | H04L 27/233 |
| 2020/0036557 A1 | 1/2020 | Kneissl et al. | |
| 2020/0145266 A1* | 5/2020 | Yang | H04L 5/0048 |

FOREIGN PATENT DOCUMENTS

| | | |
|---|---|---|
| CN | 102353393 A | 2/2012 |
| CN | 108604972 A | 9/2018 |
| JP | 2012501567 A | 1/2012 |
| WO | 2018188808 A1 | 10/2018 |

OTHER PUBLICATIONS

Qualcomm Inc. "Remaining issues on DMRS design," 3GPP TSG RAN WG1 Meeting 91, Reno, USA, R1-1721432. Nov. 27-Dec. 1, 2017, 29 pages.
CNIPA, Notification to Complete Formalities of Registration for Chinese Application No. 201880099310.X, dated Jan. 10, 2023, 6 pages with unofficial translation.
JPO, Notice of Allowance for Japanese Application No. 2021-524008, dated Jan. 27, 2023, 3 pages.
IPI, First Examination Report for Indian Application No. 202147021119, dated Jan. 2, 2023, 6 pages.
International Search Report and Written Opinion in International Application No. PCT/CN2018/113829, dated Jul. 30, 2019, 6 pages.
Qualcomm Incorporated, "Lower PAPR reference signals," 3GPP TSG RAN WG1 Meeting #94bis, R1-1811280, Oct. 12, 2018 (Oct. 12, 2018), 15 pages.
ZTE et al., "Remaining issues on PUSCH sub-PRB allocation for MTC," 3GPP TSG RAN WG1 Meeting #92bis, R1-1804176, Apr. 20, 2018 (Apr. 20, 2018), 10 pages.
Co-Pending JP Application No. 2021-524008, Japanese Office Action dated Nov. 1, 2022, 5 pages with unofficial translation.
Qualcomm Incorporation, "Lower PAPR reference signals," 3GPP TSG RAN WG1 Meeting #94bis, Chengdu, China, R1-1811941, Oct. 8-12, 2018. 18 pages.
Chinese Office Action dated Jul. 21, 2022 from corresponding Chinese application No. 201880099310X (English translation provided) (11 pages).
Huawei et al. "Performance evaluation for pi/2 BPSK with FDSS", 3GPP TSG RAN WG1 Meeting #88bis, Spokane, USA, Apr. 3-7, 2017 (R1-1705060).

* cited by examiner

GENERATING SEQUENCES FOR REFERENCE SIGNALS

CROSS-REFERENCE TO RELATED APPLICATIONS

This application is a continuation of International Patent Application No. PCT/CN2018/113829, filed on Nov. 2, 2018, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring user equipment to implement energy conservation techniques.

SUMMARY

This document relates to methods, systems, and devices for generating sequences for reference signals in mobile communication technology, including 5th Generation (5G) and New Radio (NR) communication systems.

In one exemplary aspect, a wireless communication method is disclosed. The method includes transmitting data, which is modulated using a pi/2-binary phase shift keying (BPSK) modulation, and a reference signal using a plurality of subcarriers, where the reference signal comprises a sequence from a subset of sequences that contains 30 sequences, each with a predetermined length, and where the subset of sequences include at least a first number of fixed sequences and a second number of selected sequences.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

There is an increasing demand for fourth generation of mobile communication technology (4G, the 4th Generation mobile communication technology), Long-term evolution (LTE, Long-Term Evolution), Advanced long-term evolution (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

In the new generation of NR (New Radio) technology, the Physical Uplink Control Channel (PUCCH) and the Physical Uplink Shared Channel (PUSCH) support pi/2-BPSK modulation in order to further reduce the peak-to-average ratio (PAPR) of the signal. Pi/2-BPSK is generated from the standard BPSK signal by multiplying the symbol sequence with a rotating phasor with phase increments per symbol period of pi/2. Pi/2-BPSK has the same bit error rate performance as BPSK over a linear channel, however, it exhibits less envelope variation (i.e., PAPR), making it more suitable for transmission with nonlinear channels. This improves the power-amplifier efficiency cost in the mobile terminal at lower data rates.

Pi/2-BPSK modulation is used to modulate the data portion of a signal, whereas the reference signal still uses a Zadoff-Chu (ZC) sequence or a QPSK-based computer generated sequence (referred to as CGS sequence). Current implementations have shown that if the data portion uses pi/2-BPSK modulation and the reference signal uses a ZC sequence or a CGS sequence, the PAPR between the data portion and the reference signal is different, with the PAPR of the data portion being lower than that of the reference signal.

In current implementations, when the user transmits the PUSCH or the PUCCH, the power can be adjusted only for the entire PUSCH or the PUCCH; the transmission power of a certain symbol cannot be separately adjusted. Therefore, the PAPR of the data portion bot being equal to the PAPR of the reference signal portion results in the low PAPR performance of the pi/2-BPSK modulation not being fully utilized, because the power adjustments are based on the higher PAPR of the reference signal.

Figure 1:
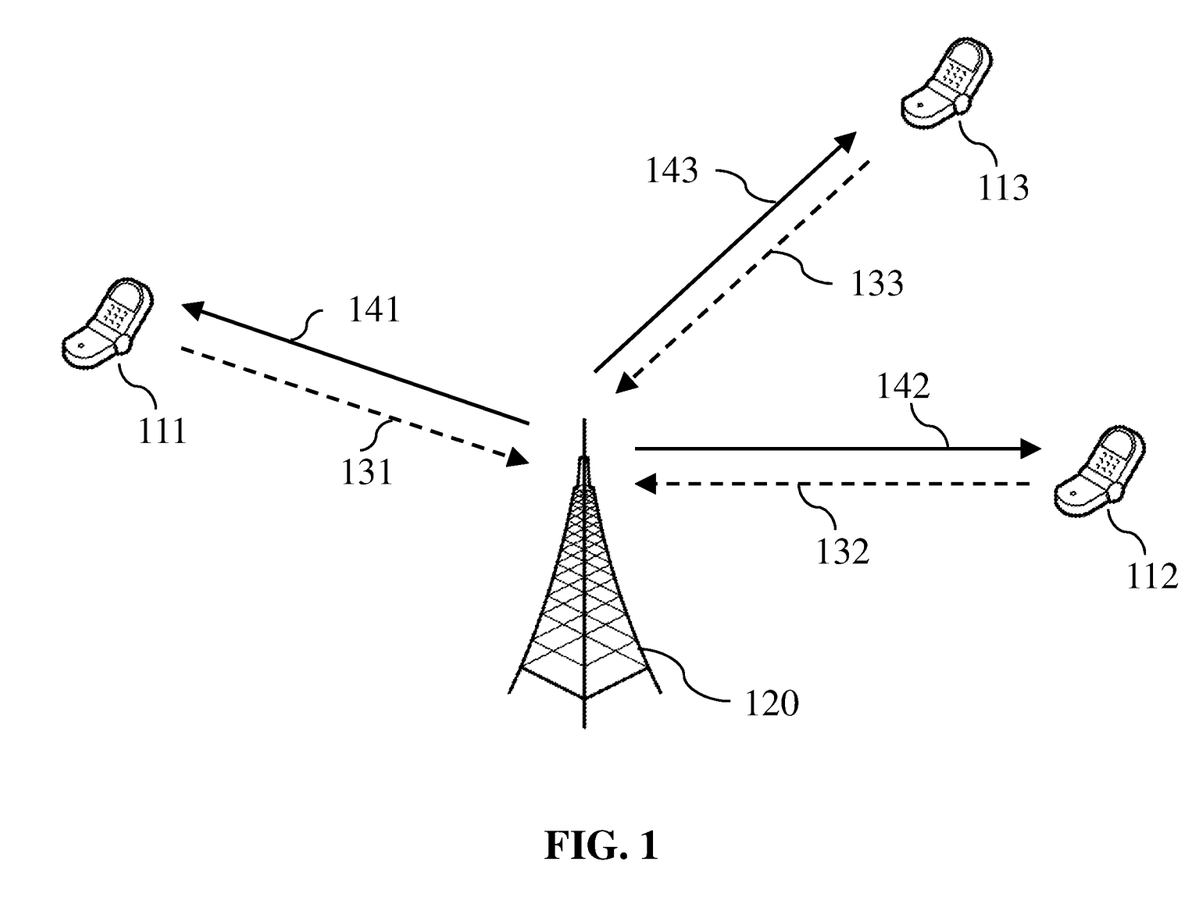
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. In some embodiments, the uplink transmissions (131, 132, 133) include $\pi/2$-BPSK modulated data portion and a reference signal that includes a sequence described by the presently disclosed technology. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Exemplary Embodiments for Sequence Searching

Method 1. Deterministic Generation Method

In some embodiments, mathematical formulas may be used to generate sequences with the desired cross-correlation properties (an example of which will be described in a later section of this document). In these scenarios, when a limited number of sequences are required, one or more sequences of a generated set of sequences may be screened out based on filtering the set of the sequences using criteria that include PAPR and cross-correlation thresholds. This screening may be implemented in the following two ways:

Implementation 1:

Step 1. Set a PAPR threshold (denoted PAPR_Threshold) and exclude a sequence whose PAPR satisfies PAPR>PAPR_Threshold, and include the sequence in a set, $S_{PAPR}$.

Step 2. The sequence of the target sequence number ($M_{target}$) is selected in the sequence set $S_{PAPR}$ to form a sequence group 51, and the selected sequence group is calculated. Whether the cross-correlation of the two sequences satisfies the set cross-correlation threshold XCorr_Threshold, if satisfied, the sequence search process ends, and the selected sequence group S1 contains the sequence as the final sequence. Otherwise, repeat Step 2 until the relevant threshold is met.

In particular, if the selected correlation threshold XCorr_Threshold is not appropriate for a specific application or purpose, there may be no sequence group that satisfies the target number of sequences. In this case, the number of attempts may be selected by setting the sequence, and when the number of attempts is exceeded, the adjustment is made (increase XCorr_Threshold), then re-execute Step 2.

Implementation 2:

Step 1. In the candidate sequence set, a specific number (M) of sequences are selected to form a sequence group, and in some scenarios, that specific number may exceed the target number of sequences ($M_{target}$), i.e., $M>M_{target}$. In the selected sequence group, the cross-correlation of a pair of sequences is calculated to satisfy the sequence number $M_{Xcorr}$ included in the sequence group formed by the set cross-correlation threshold XCorr_Threshold, and if $M_{Xcorr} \geq M_{target}$, skip to Step 2, otherwise, execute Step 1.

Step 2. In the $M_{Xcorr}$ strip sequence obtained in Step 1, sorted according to PAPR, and the $M_{target}$ sequences with the lowest PAPR are selected as the final sequences.

In particular, in Step 1, if the number of selected sequences M and the set correlation threshold are not appropriate for a specific application or purpose, there may be no sequence group that satisfies the target number of sequences. In this scenario, the number of attempts may be selected by setting the sequence. When the number of attempts is exceeded, XCorr_Threshold may be adjusted (e.g., increased) and Step 1 performed again; alternatively, the value of M may be adjusted (e.g., increased) and Step 1 re-executed.

Method 2. Random Generation Method

If the number of candidate sequences is relatively large, a certain number of candidate sequences are randomly generated, and then the target number of sequences is further searched by Method 1 in the generated candidate sequence.

Embodiments of the disclosed technology include generating sequences of length N=6, 12, 18 and 24. When the sequence length is 6 or 12, it may be preferable to use Method 1, whereas if the sequence length is 18 or 24, Method 2 may be preferred.

In some embodiments, 30 sequences may be generated. Furthermore, the PAPR threshold and the cross-correlation threshold are different for sequences of different lengths.

Exemplary Embodiments for Filtering Sequences

In some embodiments, criteria that may be used to filter out sequences from a set of sequences include the cubic metric (CM), the PAPR and the cross-correlation. The CM may be calculated using one of the following formulas:

$$CM = \frac{1}{1.56}\{20\log_{10}(\text{rms}|v_{norm}^3(t)|)\}\text{dB}$$

$$CM = \frac{1}{1.85}\{20\log_{10}(\text{rms}|v_{norm}^3(t)|) - 1.524\}\text{dB}$$

$$CM = \left(\frac{1}{1.56}\{20\log_{10}(\text{rms}|v_{norm}^3(t)|) - 1.52\} + 0.77\right)\text{dB}$$

Herein, $\text{rms}(x) = \sqrt{(x'x)/N}$ and $v_{norm}(t) = |v(t)|/\text{rms}[v(t)]$.

The PAPR may be calculated using the following formula:

$$\text{PAPR} = 10 \log_{10}(|x(t)|^2/\text{mean}(x(t)))$$

Here, mean( ) represents the mean (or average) value.

The cross-correlation of two sequences may be calculated according to one of the following formulas:

$$\text{xcorr\_coeffs} = \text{abs}(\text{NFFT}*\text{IFFT}(\text{seq1}.*\text{conj}(\text{seq2}), \text{NFFT})/\text{length}(\text{seq1})) \quad (1)$$

$$\text{xcorr\_coeffs} = \text{abs}(\text{sum}((\text{seq1}.*\text{conj}(\text{seq2})))/\text{length}(\text{seq1}) \quad (2)$$

Herein, NFFT represents the number of points of the FFT (or IFFT) operation, conj represents the conjugate, length represents the length, seq1 and seq2 are two sequences in the frequency domain, abs represents the absolute value, and sum represents the summation.

Exemplary Embodiments for Sequence Design

Example 1. In some embodiments, a terminal determines the HARQ-ACK information that needs to be fed back based on the received data, and the terminal sends the HARQ-ACK information and the reference signal of the information on L (L≥12) subcarriers of K (K≥2) symbols. In case the HARQ-ACK information is configured to used pi/2 BPSK modulation, the reference signal is transmitted on N subcarriers of one or more symbols of the K symbols (the symbol of the transmission reference signal is a reference signal symbol). The sequence transmitted on the N subcarriers of the aforementioned reference signal symbol is a sequence (of length N) of a sequence set. In an example, the sequence set contains 30 sequences, and each of the 30 sequences satisfy the following properties:

The peak-to-average ratio or CM value of each sequence does not exceed the first peak-to-average ratio or the CM preset value; and The cross-correlation of any two sequences does not exceed a first predetermined cross-correlation value.

As a specific exemplary embodiment, when the sequence length is N=12, the sequence set includes at least one of the following sequences:

Sequence 1: b(n)={1 1 1 0 0 1 1 0 0 1 0 0},

Sequence 2: b(n)={1 1 0 0 1 0 0 1 1 0 0 1},

Sequence 3: b(n)={0 0 0 1 1 0 0 1 1 0 1 1},

Sequence 4: b(n)={0 0 1 0 1 1 1 0 0 1 0 1},

Sequence 5: b(n)={0 1 0 0 1 1 0 0 0 0 0 1},

Sequence 6: b(n)={0 1 1 1 0 0 1 0 0 0 1 1},

Sequence 7: b(n)={1 0 0 1 1 1 0 0 0 0 1 1},

Sequence 8: b(n)={1 0 0 1 1 1 0 0 0 1 0 1},

Sequence 9: b(n)={1 1 0 0 0 0 1 1 1 0 0 1}, or

Sequence 10: b(n)={1 1 1 1 0 0 0 1 1 0 0 0}.

As a specific exemplary embodiment, the sequence corresponding to the integer (sequence) index u (u=0, 1, ..., 29) is given by:

$$d_u(n) = \exp\left(j\frac{\pi}{2}(n \bmod 2)\right)\frac{1}{\sqrt{2}}[(1 - 2b_u(n)) + j(1 - 2b_u(n))].$$

Herein, n=0, 1, 2, ..., N−1, N=12, and the values of u and $b_u(n)$ are shown in Table 1. In some embodiments, the index u is determined by at least one of the following:

The sequence index u is determined according to the cell identifier; or

The sequence index u is determined according to the indication signaling of the base station.

TABLE 1

| u | $b_u(n)$, n = 0, 1, 2, ..., 11 | | | | | | | | | | | |
|---|---|---|---|---|---|---|---|---|---|---|---|---|
| 0  | 0 | 0 | 0 | 1 | 1 | 0 | 0 | 1 | 1 | 0 | 0 | 1 |
| 1  | 0 | 1 | 1 | 0 | 0 | 1 | 1 | 0 | 0 | 1 | 1 | 0 |
| 2  | 0 | 0 | 0 | 1 | 1 | 1 | 0 | 0 | 0 | 1 | 1 | 1 |
| 3  | 0 | 0 | 0 | 1 | 0 | 0 | 1 | 1 | 0 | 1 | 1 | 0 |
| 4  | 0 | 0 | 0 | 1 | 0 | 1 | 1 | 0 | 0 | 0 | 1 | 1 |
| 5  | 0 | 0 | 0 | 0 | 1 | 1 | 1 | 0 | 0 | 1 | 1 | 1 |
| 6  | 0 | 0 | 0 | 1 | 1 | 1 | 0 | 0 | 1 | 1 | 1 | 0 |
| 7  | 0 | 0 | 0 | 1 | 0 | 0 | 1 | 0 | 0 | 1 | 1 | 1 |
| 8  | 0 | 0 | 0 | 1 | 1 | 1 | 0 | 0 | 1 | 0 | 0 | 1 |
| 9  | 0 | 0 | 0 | 1 | 1 | 0 | 1 | 0 | 1 | 0 | 1 | 1 |
| 10 | 0 | 0 | 0 | 1 | 1 | 0 | 1 | 1 | 0 | 0 | 1 | 1 |
| 11 | 0 | 0 | 0 | 0 | 0 | 0 | 0 | 1 | 1 | 1 | 1 | 0 |
| 12 | 0 | 0 | 0 | 0 | 0 | 1 | 0 | 1 | 1 | 0 | 1 | 0 |
| 13 | 0 | 0 | 0 | 1 | 0 | 1 | 1 | 0 | 0 | 1 | 1 | 1 |
| 14 | 0 | 0 | 0 | 1 | 0 | 0 | 1 | 0 | 0 | 1 | 1 | 0 |
| 15 | 0 | 0 | 0 | 1 | 1 | 0 | 0 | 0 | 0 | 1 | 1 | 0 |
| 16 | 0 | 0 | 0 | 0 | 0 | 0 | 0 | 1 | 1 | 1 | 1 | 1 |
| 17 | 0 | 0 | 0 | 1 | 0 | 0 | 0 | 1 | 1 | 0 | 1 | 1 |
| 18 | 0 | 0 | 0 | 1 | 0 | 0 | 1 | 1 | 1 | 0 | 0 | 1 |
| 19 | 0 | 0 | 0 | 0 | 0 | 1 | 1 | 0 | 0 | 1 | 1 | 0 |
| 20 | 0 | 0 | 0 | 0 | 0 | 1 | 1 | 0 | 0 | 1 | 1 | 1 |
| 21 | 0 | 0 | 0 | 0 | 1 | 1 | 1 | 0 | 0 | 1 | 1 | 0 |
| 22 | 0 | 0 | 0 | 1 | 1 | 0 | 0 | 1 | 0 | 0 | 1 | 1 |
| 23 | 0 | 0 | 0 | 0 | 1 | 0 | 0 | 1 | 1 | 0 | 1 | 1 |
| 24 | 0 | 0 | 0 | 0 | 1 | 0 | 1 | 1 | 0 | 0 | 0 | 1 |
| 25 | 0 | 0 | 0 | 1 | 1 | 0 | 0 | 0 | 0 | 0 | 1 | 1 |
| 26 | 0 | 0 | 0 | 1 | 1 | 0 | 0 | 1 | 1 | 0 | 0 | 1 |
| 27 | 0 | 0 | 0 | 0 | 1 | 1 | 0 | 0 | 0 | 0 | 1 | 1 |
| 28 | 0 | 0 | 0 | 0 | 1 | 1 | 0 | 0 | 0 | 1 | 1 | 0 |
| 29 | 0 | 0 | 0 | 0 | 0 | 1 | 1 | 0 | 0 | 0 | 1 | 1 |

The PAPR and cross-correlation of the sequence set in Table 1 have the following properties:

| | PAPR | | | XCORR | | |
|---|---|---|---|---|---|---|
| | Min | Mean | Max | Min | Mean | Max |
| No FDSS | 0 | 2.4476 | 4.223 | — | — | — |
| With FDSS | 0 | 0.9431 | 1.206 | 0 | 0.502 | 0.8196 |

As shown above, the PAPR is calculated for two cases: one with no FDSS (frequency domain spread shaping), and the other with FDSS operation. For Pi/2-BPSK modulation, FDSS can reduce PAPR more effectively. Cross-correlation is the calculation of the cross-correlation of sequences after FDSS operations. The cross-correlation computed above are based on Eq. (1).

In another embodiment, the values of u and $b_u(n)$ for N=12 are shown in Table 2.

TABLE 2

| u | $b_u(n)$, n = 0, 1, 2, ..., 11 | | | | | | | | | | | |
|---|---|---|---|---|---|---|---|---|---|---|---|---|
| 0  | 0 | 0 | 0 | 0 | 0 | 1 | 1 | 0 | 1 | 1 | 1 | 0 |
| 1  | 0 | 0 | 0 | 1 | 0 | 0 | 1 | 1 | 1 | 0 | 1 | 0 |
| 2  | 0 | 0 | 0 | 1 | 1 | 1 | 0 | 0 | 0 | 1 | 1 | 1 |
| 3  | 0 | 0 | 1 | 1 | 0 | 0 | 0 | 1 | 0 | 1 | 0 | 0 |
| 4  | 0 | 0 | 1 | 1 | 0 | 1 | 0 | 1 | 1 | 0 | 0 | 0 |
| 5  | 0 | 0 | 1 | 1 | 1 | 0 | 0 | 0 | 1 | 0 | 0 | 1 |
| 6  | 0 | 0 | 1 | 1 | 1 | 0 | 1 | 1 | 0 | 1 | 1 | 0 |
| 7  | 0 | 1 | 0 | 1 | 1 | 0 | 1 | 1 | 1 | 0 | 0 | 0 |
| 8  | 0 | 1 | 1 | 0 | 0 | 1 | 1 | 1 | 0 | 0 | 1 | 0 |
| 9  | 0 | 1 | 1 | 0 | 1 | 1 | 0 | 1 | 1 | 0 | 0 | 1 |
| 10 | 0 | 1 | 1 | 1 | 1 | 0 | 0 | 0 | 0 | 1 | 1 | 0 |
| 11 | 0 | 1 | 1 | 1 | 1 | 1 | 1 | 0 | 1 | 0 | 1 | 0 |
| 12 | 1 | 0 | 0 | 0 | 1 | 1 | 0 | 1 | 1 | 0 | 1 | 0 |
| 13 | 1 | 0 | 0 | 0 | 1 | 1 | 1 | 0 | 0 | 1 | 0 | 0 |
| 14 | 1 | 0 | 0 | 1 | 0 | 1 | 1 | 0 | 0 | 1 | 0 | 1 |
| 15 | 1 | 0 | 0 | 1 | 1 | 0 | 1 | 1 | 0 | 0 | 0 | 1 |
| 16 | 1 | 0 | 1 | 0 | 0 | 1 | 0 | 0 | 1 | 1 | 0 | 0 |
| 17 | 1 | 0 | 1 | 1 | 0 | 0 | 0 | 1 | 1 | 0 | 0 | 1 |
| 18 | 1 | 0 | 1 | 1 | 0 | 0 | 1 | 0 | 0 | 0 | 0 | 1 |
| 19 | 1 | 0 | 1 | 1 | 0 | 1 | 0 | 0 | 1 | 1 | 1 | 1 |
| 20 | 1 | 1 | 0 | 0 | 1 | 0 | 0 | 1 | 1 | 0 | 0 | 1 |
| 21 | 1 | 1 | 0 | 0 | 1 | 1 | 0 | 0 | 1 | 1 | 0 | 0 |
| 22 | 1 | 1 | 0 | 1 | 0 | 1 | 1 | 0 | 0 | 0 | 1 | 0 |
| 23 | 1 | 1 | 0 | 1 | 0 | 1 | 1 | 0 | 1 | 1 | 0 | 0 |
| 24 | 1 | 1 | 0 | 1 | 1 | 0 | 0 | 1 | 0 | 1 | 1 | 0 |
| 25 | 1 | 1 | 0 | 1 | 1 | 0 | 1 | 0 | 1 | 0 | 0 | 1 |
| 26 | 1 | 1 | 1 | 0 | 0 | 0 | 0 | 1 | 1 | 1 | 1 | 1 |
| 27 | 1 | 1 | 1 | 0 | 0 | 1 | 1 | 0 | 0 | 1 | 0 | 0 |
| 28 | 1 | 1 | 1 | 1 | 0 | 0 | 1 | 1 | 0 | 1 | 0 | 0 |
| 29 | 1 | 1 | 1 | 1 | 1 | 0 | 0 | 0 | 1 | 1 | 0 | 0 |

The PAPR and cross-correlation of the sequence set in Table 2 have the following properties (wherein the cross-correlation is computed based on Eq. (2)):

| | PAPR | | | XCORR | | |
|---|---|---|---|---|---|---|
| | Min | Mean | Max | Min | Mean | Max |
| No FDSS | 0 | 2.6156 | 4.0970 | 0 | 0.2295 | 0.5 |
| With FDSS | 0.0006 | 0.8839 | 0.9977 | 0 | 0.2746 | 0.5 |

In another embodiment, the values of u and $b_u(n)$ for N=12 are shown in Table 3.

TABLE 3

Values of $b_u(n)$ for N = 12

| u | $b_u(n)$, n = 0, 1, 2, ..., 11 |
|---|---|
| 0  | 0 0 0 0 1 1 0 1 0 0 1 1 |
| 1  | 0 0 1 1 0 0 1 1 1 0 0 0 |
| 2  | 0 0 1 1 0 1 0 0 1 1 0 0 |
| 3  | 0 0 1 1 0 1 1 0 0 0 0 1 |
| 4  | 0 0 1 1 1 1 1 0 1 0 1 1 |
| 5  | 0 0 1 1 1 1 1 1 0 0 0 0 |
| 6  | 0 1 0 0 1 0 0 1 1 0 0 0 |
| 7  | 0 1 0 0 1 1 0 0 1 0 1 1 |
| 8  | 0 1 0 1 1 0 1 0 0 0 0 0 |
| 9  | 0 1 1 0 0 0 1 0 0 1 1 1 |
| 10 | 0 1 1 0 0 1 1 1 0 0 1 0 |
| 11 | 0 1 1 1 1 1 1 0 1 1 0 0 |
| 12 | 1 0 0 0 0 1 1 0 0 1 1 0 |
| 13 | 1 0 0 1 0 1 1 1 0 0 0 1 |
| 14 | 1 0 0 1 1 0 1 0 0 1 0 0 |
| 15 | 1 0 0 1 1 0 1 1 0 1 1 1 |
| 16 | 1 0 0 1 1 1 0 0 0 1 1 1 |
| 17 | 1 0 1 0 0 1 1 1 0 0 0 1 |
| 18 | 1 0 1 0 1 0 1 0 0 1 0 1 |
| 19 | 1 0 1 1 1 0 0 1 0 0 0 1 |
| 20 | 1 0 1 1 1 1 0 0 0 1 0 0 |
| 21 | 1 1 0 0 0 1 1 0 1 0 0 1 |
| 22 | 1 1 0 0 1 1 0 0 1 1 0 0 |
| 23 | 1 1 0 0 1 1 1 1 0 0 0 0 |
| 24 | 1 1 0 1 0 1 1 0 0 0 1 0 |
| 25 | 1 1 0 1 1 0 0 1 0 0 1 0 |
| 26 | 1 1 1 0 0 1 1 0 0 1 0 0 |
| 27 | 1 1 1 0 1 1 0 0 1 0 0 1 |
| 28 | 1 1 1 1 0 0 0 0 0 0 1 1 |
| 29 | 1 1 1 1 0 0 0 1 1 0 0 0 |

The PAPR and cross-correlation of the sequence set in Table 3 have the following properties (wherein the cross-correlation is computed based on Eq. (2)):

| | PAPR | | | XCORR | | |
|---|---|---|---|---|---|---|
| | Min | Mean | Max | Min | Mean | Max |
| No FDSS | 0 | 2.6156 | 4.0970 | 0 | 0.2295 | 0.5 |
| With FDSS | 0.0006 | 0.8839 | 0.9977 | 0 | 0.2746 | 0.5 |

In yet another embodiment, the values of u and $b_u(n)$ for N=12 are shown in Table 4.

TABLE 4

Values of $b_u(n)$ for N = 12

| u | $b_u(n)$, n = 0,1,2, ... ,11 |
|---|---|
| 0  | 0 1 1 0 0 0 1 1 1 0 0 0 |
| 1  | 1 1 0 0 0 0 0 1 1 1 1 0 |
| 2  | 1 1 1 1 0 0 1 0 0 0 0 1 |
| 3  | 0 0 1 0 1 1 1 0 1 0 0 0 |
| 4  | 0 1 1 0 1 0 0 0 1 0 0 0 |
| 5  | 0 0 1 0 0 1 1 0 0 0 0 1 |
| 6  | 0 1 1 0 0 0 1 1 1 1 0 0 |
| 7  | 1 0 0 1 0 0 0 1 1 0 1 1 |
| 8  | 0 1 0 0 1 0 1 1 0 1 1 1 |
| 9  | 1 0 0 1 0 1 0 0 1 1 1 0 |
| 10 | 1 0 1 0 0 1 0 1 1 1 0 0 |
| 11 | 1 0 1 0 0 1 1 1 0 0 1 1 |
| 12 | 0 0 1 1 0 0 0 0 1 0 1 1 |
| 13 | 0 1 0 0 0 1 1 1 0 1 1 1 |
| 14 | 1 0 0 1 1 0 1 0 1 0 0 0 |
| 15 | 0 1 1 1 0 1 0 0 0 0 1 0 |
| 16 | 1 0 0 0 1 0 1 0 0 1 0 0 |
| 17 | 1 1 0 1 1 0 1 1 0 0 0 0 |
| 18 | 0 1 1 0 1 0 0 1 0 1 1 0 |
| 19 | 0 1 1 0 0 1 0 1 1 0 1 0 |
| 20 | 0 0 0 1 1 1 0 0 1 1 0 0 |
| 21 | 1 0 0 1 0 0 1 1 1 0 0 0 |
| 22 | 1 1 1 0 0 0 1 0 0 1 0 0 |
| 23 | 0 0 1 1 0 0 1 1 0 0 1 1 |
| 24 | 1 1 0 0 0 0 1 1 0 0 1 1 |
| 25 | 0 1 0 1 0 0 1 1 0 1 0 0 |
| 26 | 0 0 0 1 1 0 1 1 0 0 0 1 |
| 27 | 1 1 0 1 1 0 0 0 1 0 0 1 |
| 28 | 0 1 1 1 0 1 1 1 1 0 0 1 |
| 29 | 1 1 1 1 0 1 0 0 1 0 0 0 |

The PAPR and cross-correlation of the sequence set in Table 4 have the following properties (wherein the cross-correlation is computed based on Eq. (2)):

| | PAPR | | | XCORR | | |
|---|---|---|---|---|---|---|
| | Min | Mean | Max | Min | Mean | Max |
| No FDSS | 0 | 2.562 | 3.6522 | 0 | 0.2195 | 0.5 |
| With FDSS | 0 | 0.7923 | 0.9137 | 0 | 0.2917 | 0.4974 |

As a specific exemplary embodiment, when the sequence length is N=24, the sequence set includes at least one of the following sequences:

Sequence 1: b(n)={1 0 0 1 0 1 0 0 1 1 0 1 1 0 0 1 1 0 0 0 0 0 1 1},

Sequence 2: b(n)={0 0 0 1 1 0 1 0 1 1 0 0 0 0 0 1 1 0 0 1 1 0 1 1},

Sequence 3: b(n)={0 0 1 1 1 0 1 0 0 1 1 0 0 1 1 1 1 1 0 0 1 0 1 0},

Sequence 4: b(n)={1 0 0 1 1 1 1 1 1 0 0 1 1 0 0 1 0 1 1 0 0 0 0 0 1},

Sequence 5: b(n)={0 1 0 1 1 0 0 1 1 0 1 0 1 1 0 0 0 0 1 1 0 0 1 1},

Sequence 6: b(n)={1 0 0 1 0 0 1 1 0 0 1 0 1 0 0 1 1 1 0 0 0 1 0 0},

Sequence 7: b(n)={0 1 0 1 1 1 0 1 1 0 0 0 1 0 1 1 1 0 0 1 0 0 0 1},

Sequence 8: b(n)={1 0 1 1 0 0 1 1 0 1 0 0 1 1 1 0 1 1 0 1 1 1 0 0},

Sequence 9: b(n)={0 1 1 0 0 1 1 0 0 0 0 1 0 0 1 0 0 0 0 0 0 1 1 1},

Sequence 10: b(n)={1 1 1 0 0 1 0 0 1 1 0 1 1 1 1 0 0 1 0 1 1 0 0 1},

Sequence 11: b(n)={1 1 0 0 0 0 0 0 1 1 0 0 1 1 1 0 1 1 1 0 1 1 0 1},

Sequence 12: b(n)={0 0 0 0 1 1 1 1 1 1 1 0 0 1 1 0 0 1 0 0 0 1 1 1},

Sequence 13: b(n)={1 1 0 0 1 1 0 1 0 1 1 0 0 0 1 1 1 0 1 1 0 1 1 0}, or

Sequence 14: b(n)={1 1 0 0 1 0 1 0 1 0 0 1 0 0 1 1 1 0 0 1 0 1 0 0}.

In yet another embodiment, the values of u and $b_u(n)$ for N=24 are shown in Table 4.

TABLE 5

Values of $b_u(n)$ for N = 24

| u | b(n), n = 0, 1, 2, ..., 23 |
|---|---|
| 0  | 0 0 0 0 0 1 1 0 1 0 1 0 0 1 1 1 0 1 1 0 1 1 0 0 |
| 1  | 0 0 0 0 1 1 1 1 1 0 0 1 0 1 1 1 0 0 0 0 1 1 1 1 |
| 2  | 1 0 0 0 0 0 1 1 0 0 1 1 1 0 1 0 0 1 1 1 1 0 0 1 |
| 3  | 0 1 1 0 1 0 0 1 1 0 1 0 1 0 0 0 1 0 0 1 1 1 0 1 |
| 4  | 1 1 1 1 1 0 0 0 0 0 1 1 1 0 1 1 0 1 0 0 1 1 0 0 |
| 5  | 0 1 1 0 0 0 1 1 0 0 0 1 1 1 0 1 1 0 1 0 1 0 1 1 |
| 6  | 1 0 0 1 0 0 1 0 0 0 1 1 1 1 0 0 0 0 1 1 1 1 1 0 |
| 7  | 1 0 0 1 0 1 0 0 1 1 0 0 0 0 1 1 1 1 1 1 1 0 0 1 |
| 8  | 1 0 0 1 0 0 1 1 0 1 0 1 0 0 1 1 0 0 0 0 1 0 1 1 |
| 9  | 0 0 0 1 1 0 1 0 1 1 0 0 0 0 1 1 0 0 1 0 1 0 1 1 |
| 10 | 1 1 1 0 0 0 1 0 0 1 0 0 0 1 1 0 1 1 0 1 0 0 1 1 |
| 11 | 0 0 0 0 1 1 0 0 0 1 1 1 1 1 0 1 1 0 0 0 1 1 1 0 |
| 12 | 0 0 1 1 0 1 0 1 1 1 1 0 0 0 0 1 0 1 1 0 1 0 1 1 |
| 13 | 1 1 0 0 0 0 0 1 1 1 1 1 0 0 0 1 1 0 0 1 1 0 0 1 |
| 14 | 0 0 1 1 1 1 0 1 1 0 0 0 1 0 0 0 1 1 0 1 0 1 1 0 |
| 15 | 0 0 1 1 0 0 1 0 0 1 0 1 1 0 1 1 0 1 0 1 1 1 1 1 |
| 16 | 1 1 0 0 1 1 0 1 0 1 0 1 0 0 0 1 1 1 0 1 1 1 0 0 |
| 17 | 0 1 0 0 1 1 1 0 0 1 1 0 1 1 0 0 0 1 0 1 1 0 0 0 |
| 18 | 0 0 0 1 1 1 1 0 0 0 0 1 0 1 0 0 1 1 1 1 0 0 0 0 |
| 19 | 0 1 1 0 1 0 1 1 0 1 1 0 0 0 1 1 0 1 1 1 1 1 0 0 |
| 20 | 1 0 1 0 0 1 0 0 1 1 1 1 1 0 0 0 1 0 0 1 0 0 0 1 |
| 21 | 1 0 1 1 0 1 1 0 0 0 1 0 1 1 0 1 0 0 1 0 0 0 0 1 |
| 22 | 0 1 0 0 0 1 1 0 1 1 0 0 1 0 1 1 0 0 0 1 1 0 1 0 |
| 23 | 0 1 1 0 0 1 1 0 0 0 0 1 0 0 1 0 0 0 0 0 0 1 1 1 |
| 24 | 0 1 0 0 1 0 0 0 0 0 1 1 1 1 0 0 0 0 1 0 1 0 1 1 |
| 25 | 1 0 0 1 0 0 0 1 1 1 1 1 0 0 1 0 0 0 1 0 1 1 1 0 |
| 26 | 1 1 0 0 0 0 0 0 1 1 0 0 1 1 1 0 1 1 1 0 1 1 0 1 |
| 27 | 0 1 0 1 1 0 0 1 1 0 1 0 1 1 0 0 0 0 1 1 0 0 1 1 |
| 28 | 0 0 1 1 1 0 1 0 0 1 1 0 0 1 1 1 1 1 0 0 1 0 1 0 |
| 29 | 1 1 0 1 0 1 1 1 1 0 0 1 0 0 0 1 1 1 1 0 1 1 0 0 |

The PAPR and cross-correlation of the sequence set in Table 5 have the following properties (wherein the cross-correlation is computed based on Eq. (1)):

| | PAPR | | | XCORR | | |
|---|---|---|---|---|---|---|
| | Min | Mean | Max | Min | Mean | Max |
| No FDSS | 2.4742 | 3.128 | 3.8414 | 0 | 0.1429 | 0.3333 |
| With FDSS | 0.7489 | 0.8119 | 0.8307 | 0 | 0.1914 | 0.348 |

In yet another embodiment, the values of u and $b_u(n)$ for N=24 are shown in Table 6.

TABLE 6

Values of $b_u(n)$ for N = 24

| u | b(n), n = 0, 1, 2, ..., 23 |
|---|---|
| 0  | 0 0 1 1 1 0 0 1 0 1 0 0 1 1 1 0 1 1 0 0 0 0 1 1 |
| 1  | 0 0 1 1 0 1 1 0 1 1 0 1 1 1 1 1 0 0 1 0 1 1 0 0 |
| 2  | 1 1 1 1 0 0 1 0 1 1 1 0 0 0 1 0 0 1 1 0 0 0 0 1 |
| 3  | 1 0 0 0 1 1 0 1 0 0 1 1 0 1 0 0 0 0 1 0 0 0 1 1 |
| 4  | 0 1 1 0 0 1 1 1 1 0 0 1 0 1 1 0 0 0 0 1 0 1 0 0 |
| 5  | 0 0 0 1 1 1 1 1 0 0 0 1 1 0 1 0 0 0 0 1 1 1 0 0 |
| 6  | 0 0 1 0 0 1 1 0 1 0 1 1 1 0 0 0 1 1 0 0 1 1 1 1 |
| 7  | 1 1 1 0 0 1 0 0 1 1 0 1 1 1 1 1 0 0 1 1 0 1 0 1 |
| 8  | 1 0 1 1 0 1 1 1 1 0 0 0 0 0 1 0 1 0 1 0 0 1 1 1 |
| 9  | 1 1 1 0 1 0 0 1 0 1 1 1 0 0 1 0 0 1 1 0 0 0 0 1 |
| 10 | 0 0 1 0 1 0 1 0 1 1 1 0 0 1 0 1 0 0 1 1 1 1 0 0 |
| 11 | 1 0 0 0 0 0 1 1 1 0 1 0 1 1 1 0 0 0 0 0 1 0 1 0 |
| 12 | 0 0 1 0 0 0 1 1 0 1 1 0 1 0 1 0 0 0 0 0 1 1 1 1 |
| 13 | 0 1 1 0 0 0 0 1 1 1 0 1 1 0 0 1 1 0 0 0 1 0 0 1 |
| 14 | 1 0 1 0 0 1 0 0 1 1 1 1 1 1 0 0 1 0 0 1 0 0 0 0 |
| 15 | 1 0 0 0 1 1 0 0 0 1 1 0 0 1 1 1 0 0 0 1 1 1 1 1 |
| 16 | 1 1 0 0 1 1 0 1 0 1 1 0 0 0 1 1 1 0 0 1 0 0 0 1 |
| 17 | 0 1 1 1 0 0 1 0 0 0 0 1 1 0 1 1 0 1 0 1 1 0 1 1 |
| 18 | 1 1 0 0 1 0 1 0 1 0 0 1 0 0 1 1 0 0 1 0 1 1 1 1 |
| 19 | 0 1 1 0 1 0 1 1 0 1 1 0 0 0 1 1 0 1 1 1 1 1 0 0 |
| 20 | 0 1 0 1 1 1 0 1 1 0 0 0 1 0 1 1 1 0 0 1 0 0 0 1 |
| 21 | 1 0 0 1 0 1 0 0 1 0 1 1 1 1 0 1 1 0 1 0 0 1 1 1 |
| 22 | 0 1 1 0 1 0 0 0 1 1 0 1 1 0 1 1 0 0 0 0 0 1 1 0 |
| 23 | 0 0 0 1 1 1 1 0 0 1 0 1 0 0 1 1 1 0 1 1 1 0 0 1 |
| 24 | 0 0 1 1 1 0 0 1 0 0 0 1 1 0 0 0 1 1 1 1 1 1 0 0 |
| 25 | 0 1 0 0 1 1 1 0 0 0 1 1 1 1 0 0 0 0 1 0 1 1 0 1 |
| 26 | 0 1 0 1 1 0 0 1 1 0 1 0 1 1 0 0 0 0 1 1 0 0 1 1 |
| 27 | 0 0 1 1 1 0 1 0 0 1 1 0 0 1 1 1 1 1 0 0 1 0 1 0 |
| 28 | 1 0 1 1 0 1 1 0 1 0 1 1 0 0 0 0 0 0 1 1 0 0 0 1 |
| 29 | 0 1 0 0 1 0 1 1 1 0 0 1 1 0 0 1 0 1 1 1 1 0 0 1 |

The PAPR and cross-correlation of the sequence set in Table 6 have the following properties (wherein the cross-correlation is computed based on Eq. (2)):

| | PAPR | | | XCORR | | |
|---|---|---|---|---|---|---|
| | Min | Mean | Max | Min | Mean | Max |
| No FDSS | 2.3842 | 3.0661 | 3.8448 | 0 | 0.1462 | 0.3333 |
| With FDSS | 0.7648 | 0.8082 | 0.2686 | 0 | 0.1921 | 0.349 |

In yet another embodiment, the values of u and $b_u(n)$ for N=24 are shown in Table 7.

TABLE 7

Values of $b_u(n)$ for N = 24

| u | b(n), n = 0, 1, 2, ..., 23 |
|---|---|
| 0  | 0 0 0 0 1 1 1 1 1 0 0 1 0 1 1 1 0 0 0 0 1 1 1 1 |
| 1  | 1 1 0 1 0 1 1 1 0 0 1 1 1 0 0 0 0 0 1 1 0 1 1 0 |
| 2  | 0 0 0 0 0 1 1 1 0 0 0 1 1 0 1 1 1 1 0 0 1 1 0 0 |
| 3  | 0 1 0 0 1 1 0 1 0 1 0 0 1 1 1 1 1 0 0 0 1 1 1 0 |
| 4  | 0 1 0 0 1 1 1 1 0 0 1 0 0 1 1 1 1 0 1 1 0 0 1 1 |
| 5  | 1 0 1 0 1 1 1 0 1 0 1 0 0 1 0 1 1 0 0 0 0 1 0 1 |
| 6  | 1 0 0 1 0 1 1 0 1 0 0 1 0 1 0 1 1 0 1 0 0 0 1 1 |
| 7  | 1 1 1 0 1 0 1 0 0 1 0 0 0 1 0 0 1 1 1 0 0 1 0 1 |
| 8  | 1 1 1 1 0 0 1 0 0 1 1 0 1 1 1 1 0 0 1 0 1 1 0 0 |
| 9  | 0 0 0 1 1 1 1 1 0 1 0 0 1 0 0 1 1 0 0 1 0 1 1 1 |
| 10 | 0 0 0 1 1 0 1 0 1 1 0 0 0 0 0 0 1 1 0 0 1 0 1 1 |
| 11 | 1 0 0 1 0 0 0 1 1 1 1 1 0 0 1 0 0 0 1 1 1 0 0 0 |
| 12 | 0 0 1 1 1 1 0 0 1 0 0 1 0 1 1 0 0 0 0 1 1 0 1 0 |
| 13 | 0 1 1 1 0 0 1 0 0 1 0 1 1 1 0 1 1 0 1 0 1 1 1 1 |
| 14 | 1 1 0 0 1 0 1 0 1 0 0 1 0 0 1 1 1 0 1 0 1 0 0 0 |
| 15 | 1 0 1 1 0 0 0 1 1 0 1 0 0 1 1 1 1 0 0 1 0 0 0 1 |
| 16 | 0 0 1 0 1 0 0 0 0 0 1 1 0 0 1 1 1 0 1 1 1 1 1 1 |
| 17 | 0 1 0 1 1 1 0 0 1 0 0 1 0 1 0 1 1 0 0 0 0 0 0 1 |
| 18 | 0 1 1 1 0 0 1 1 1 0 0 0 0 0 1 1 1 1 0 0 0 0 0 1 |
| 19 | 0 0 1 1 1 1 1 0 0 1 1 0 0 0 0 0 1 1 0 1 1 1 0 1 |
| 20 | 0 1 1 0 1 0 0 0 1 1 0 1 1 0 1 1 0 0 0 0 0 1 1 0 |
| 21 | 0 1 1 1 0 0 0 1 1 1 0 0 0 0 0 1 0 1 1 1 1 1 1 0 |
| 22 | 1 0 1 1 0 1 1 1 1 1 1 0 0 1 1 0 0 1 0 0 1 1 1 0 |
| 23 | 0 1 0 1 1 0 0 0 0 1 1 0 1 1 0 0 1 0 0 1 1 1 1 0 |
| 24 | 0 1 1 0 1 0 1 0 0 1 0 0 1 1 0 0 0 1 1 1 1 1 0 0 |
| 25 | 0 1 1 0 0 1 1 0 0 0 0 1 0 0 1 0 0 0 0 0 0 1 1 1 |
| 26 | 0 0 1 1 0 1 0 0 0 0 0 1 1 0 0 0 1 1 1 1 1 0 1 1 |
| 27 | 0 0 1 0 1 0 0 1 1 1 1 1 0 0 0 0 1 0 0 1 0 0 1 1 |
| 28 | 0 0 1 1 1 0 1 0 0 1 1 0 0 1 1 1 1 1 0 0 1 0 1 0 |
| 29 | 0 1 0 0 1 1 1 1 1 0 0 0 0 0 0 1 0 0 1 1 1 1 0 0 |

The PAPR and cross-correlation of the sequence set in Table 7 have the following properties (wherein the cross-correlation is computed based on Eq. (2)):

|  | PAPR | | | XCORR | | |
| --- | --- | --- | --- | --- | --- | --- |
|  | Min | Mean | Max | Min | Mean | Max |
| No FDSS | 2.3862 | 3.1312 | 3.6537 | 0 | 0.1473 | 0.3333 |
| With FDSS | 0.7564 | 0.8123 | 0.8307 | 0 | 0.1975 | 0.3480 |

Example 2. In some embodiments, the terminal transmits data and a reference signal for demodulating the data on L (L≥6) subcarriers of K (K≥2) symbols according to the received downlink control information, where the reference signal is transmitted on N subcarriers of one or more symbols of the above K symbols (the symbol of the transmission reference signal is a reference signal symbol). When the downlink control information indicates that the terminal performs data modulation by using a pi/2-BPSK modulation mode, the sequence is sent on N subcarriers of the reference signal symbol, where the sequence (of length N) is a sequence of a sequence set. In an example, N=6, 12, 18 or 24.

As a specific exemplary embodiment, when the sequence length is N=30, the sequence set includes at least one of the following sequences:

Sequence 1: $b(n)$={0 1 0 0 1 1 0 0 1 1 1 0 0 0 1 1 1 1 0 0 0 1 0 0 1 1 0 0 1},

Sequence 2: $b(n)$={1 1 0 0 1 1 0 0 0 0 0 0 1 1 0 1 1 1 0 0 0 0 0 1 1 1 1 1 0 0}, Sequence 3: $b(n)$={1 1 0 1 1 0 0 1 1 0 0 0 0 0 0 1 0 0 1 1 1 0 0 0 0 1 0 0 1 1}, Sequence 4: $b(n)$={0 0 1 1 1 1 0 0 1 1 1 0 0 0 0 0 0 1 1 0 1 0 0 1 1 0 0 0 1 1}, Sequence 5: $b(n)$={0 1 0 1 1 0 1 1 0 0 0 0 1 1 0 1 1 1 0 1 1 0 1 1 0 0 1 1 1 0}, or Sequence 6: $b(n)$={0 1 1 0 0 1 1 0 1 0 0 1 1 0 1 0 1 0 1 1 0 0 0 0 1 1 0 1 0 0}.

In yet another embodiment, the values of u and $b_u(n)$ for N=30 are shown in Table 8.

TABLE 8

Values of $b_u(n)$ for N = 30

| u | b(n), n = 0, 1, 2, . . . , 29 |
| --- | --- |
| 0 | 1 0 1 1 0 1 0 0 0 0 1 1 1 1 0 1 1 1 1 0 0 1 0 1 0 0 1 0 1 |
| 1 | 0 0 1 0 1 0 1 1 1 0 0 1 0 0 0 1 1 0 1 0 0 1 0 1 0 1 0 0 1 1 |
| 2 | 0 0 0 1 1 0 0 0 1 1 0 1 0 0 1 0 1 1 0 0 0 1 0 0 1 1 1 1 1 1 |
| 3 | 1 1 0 1 1 0 0 0 0 1 1 1 1 0 0 1 1 0 1 1 0 0 0 0 1 1 1 1 1 0 |
| 4 | 0 0 1 0 1 1 0 1 0 0 1 0 0 1 0 0 1 1 1 1 1 0 0 1 1 0 0 0 0 1 |
| 5 | 1 0 1 1 1 0 1 1 0 1 0 0 0 0 0 1 1 1 1 0 0 1 0 0 0 0 1 1 0 0 1 |
| 6 | 0 0 1 0 0 1 1 0 1 1 0 1 0 1 1 1 0 0 1 0 1 1 0 0 0 0 0 1 1 1 |
| 7 | 1 1 1 0 0 1 0 1 1 0 1 0 1 0 0 1 1 0 0 1 0 1 1 0 0 1 0 0 1 1 |
| 8 | 0 1 1 1 0 1 1 1 1 0 0 0 1 1 1 0 0 0 0 0 0 1 1 1 1 0 1 0 |
| 9 | 1 0 0 1 0 1 1 0 1 0 1 1 0 0 1 1 0 1 0 0 1 1 1 1 1 0 0 1 0 |
| 10 | 0 1 1 0 0 0 0 0 1 1 0 1 1 0 1 0 0 0 0 1 1 0 1 0 0 1 1 1 0 1 |
| 11 | 0 1 1 1 0 0 1 0 1 0 0 1 1 1 1 1 0 1 1 0 0 1 0 0 1 0 0 1 1 |
| 12 | 1 1 0 1 1 0 0 1 1 0 0 0 0 0 1 0 0 1 1 1 0 0 0 0 1 0 0 1 1 |
| 13 | 1 0 0 1 0 0 0 1 1 1 1 1 1 1 0 0 0 0 0 0 0 1 1 0 1 1 1 0 1 0 |
| 14 | 0 1 1 1 1 0 1 1 0 1 1 1 0 0 0 1 0 0 1 1 0 0 1 0 1 0 0 1 0 0 |
| 15 | 1 0 0 0 0 1 1 0 1 0 0 1 1 1 1 1 1 0 0 1 0 1 1 0 0 0 1 1 0 1 |
| 16 | 0 0 1 1 0 0 0 0 1 0 0 1 1 1 0 1 0 1 1 1 0 0 0 1 0 1 1 0 |
| 17 | 0 1 0 0 1 1 0 0 1 1 1 0 0 0 1 1 1 1 1 0 0 0 1 0 0 1 1 0 0 1 |
| 18 | 0 1 1 1 1 1 0 0 1 0 0 1 0 1 0 1 1 0 0 0 1 1 1 1 1 0 1 1 0 0 |
| 19 | 0 0 0 1 1 1 1 1 1 1 0 0 1 0 0 1 1 0 1 1 0 1 0 1 1 0 1 1 0 0 |
| 20 | 1 1 0 1 1 0 0 1 0 0 1 0 1 1 1 0 0 0 0 0 1 1 0 1 0 0 1 0 0 1 |
| 21 | 0 1 1 1 1 0 0 0 0 1 1 1 1 0 1 1 1 0 0 1 1 1 1 0 0 0 0 1 0 |
| 22 | 1 1 0 0 1 0 1 0 0 1 0 0 1 0 1 1 0 0 0 0 1 1 0 1 0 1 0 0 |
| 23 | 1 0 1 1 1 0 0 1 0 1 0 1 1 0 1 1 0 0 0 0 1 0 1 0 0 0 0 1 |
| 24 | 0 0 1 0 0 1 1 1 0 1 1 0 0 0 1 1 1 0 0 1 0 0 1 1 1 0 1 0 1 1 |
| 25 | 0 1 0 1 0 1 1 0 0 0 0 1 1 0 1 1 1 0 1 1 0 1 1 0 0 1 1 1 0 |
| 26 | 1 0 1 1 0 1 0 1 0 0 1 0 1 0 0 1 0 0 1 0 1 0 0 0 1 1 0 |
| 27 | 1 1 1 1 0 0 1 0 0 1 0 1 1 1 1 0 1 1 0 0 0 0 1 0 1 |
| 28 | 1 1 1 1 0 1 0 1 1 0 1 1 0 0 0 1 0 1 1 0 0 0 0 0 0 0 |
| 29 | 0 1 0 0 0 1 0 1 1 0 0 1 0 0 1 1 1 1 0 0 0 0 1 1 0 1 1 1 0 |

The PAPR and cross-correlation of the sequence set in Table 8 have the following properties (wherein the cross-correlation is computed based on Eq. (2)):

|  | PAPR | | | XCORR | | |
| --- | --- | --- | --- | --- | --- | --- |
|  | Min | Mean | Max | Min | Mean | Max |
| No FDSS | 2.7902 | 3.2174 | 3.7735 | 0 | 0.1275 | 0.3333 |
| With FDSS | 0.7576 | 0.8204 | 0.8505 | 0.009 | 0.1695 | 0.3158 |

In yet another embodiment, the values of u and $b_u(n)$ for N=30 are shown in Table 9.

Sequence 9: b(n)={0 1 0 0 0 1 1 0 1 1 0 1 1 0 0 0 1 0},
Sequence 10: b(n)={1 1 1 0 0 0 1 1 1 0 0 0 1 1 1 0 0 0},
Sequence 11: b(n)={0 0 0 1 1 0 1 1 1 0 0 0 1 0 0 1 1 1},
Sequence 12: b(n)={0 1 0 0 1 0 0 1 1 1 0 1 1 0 1 1 1 0},
Sequence 13: b(n)={1 0 0 0 1 0 0 1 0 0 0 1 1 0 1 1 0 1},
Sequence 14: b(n)={1 0 0 1 1 1 1 1 0 0 1 1 0 0 0 0 0 1},
Sequence 15: b(n)={1 1 0 0 0 1 1 0 1 1 1 0 0 0 1 0 0 1},
Sequence 16: b(n)={1 1 0 0 0 1 1 1 0 0 0 1 1 1 0 0 0 1},
Sequence 17: b(n)={1 1 0 0 1 1 1 1 1 0 0 1 1 0 0 0 0 0},
or
Sequence 18: b(n)={1 1 0 1 1 0 1 1 1 0 0 1 0 0 1 0 0 1}.

In yet another embodiment, the values of u and $b_u(n)$ for N=18 are shown in Table 10.

TABLE 9

Values of $b_u(n)$ for N = 30

| u | b(n), n = 0, 1, 2, ..., 29 |
| --- | --- |
| 0 | 0 0 1 0 1 0 1 1 1 0 0 1 0 0 0 1 1 0 1 0 0 1 0 1 0 1 0 0 1 1 |
| 1 | 1 0 0 0 1 0 0 1 0 1 1 1 0 0 1 1 1 0 0 1 1 0 0 0 1 0 1 0 1 |
| 2 | 0 0 0 1 0 1 1 0 0 0 1 1 1 1 1 0 0 0 1 1 0 1 1 0 0 0 0 1 1 |
| 3 | 0 0 1 0 1 1 0 1 0 0 1 0 0 1 1 1 1 1 0 0 1 1 0 0 0 0 1 |
| 4 | 0 1 0 0 0 1 1 1 1 1 1 0 0 0 1 0 0 0 1 1 1 1 0 0 0 1 0 |
| 5 | 0 0 0 0 1 1 1 1 0 0 0 0 1 1 1 1 0 0 1 0 0 0 1 1 0 1 1 1 |
| 6 | 1 1 0 0 1 0 1 1 1 0 0 0 0 0 1 1 0 0 1 1 1 1 0 0 0 1 1 0 1 |
| 7 | 0 0 1 1 0 0 1 0 1 0 0 1 0 1 1 1 1 0 0 0 1 1 1 0 0 0 1 0 1 |
| 8 | 0 1 1 0 0 0 0 0 1 1 0 0 1 0 1 0 1 1 0 1 1 1 0 0 0 1 1 0 1 |
| 9 | 1 0 0 1 0 1 1 0 0 1 0 1 0 0 1 0 1 1 0 1 0 0 1 1 1 0 0 0 |
| 10 | 1 0 1 0 1 0 0 1 0 1 0 0 1 1 0 1 1 0 1 0 0 1 0 0 0 0 0 0 1 |
| 11 | 0 0 0 0 0 1 1 0 1 0 1 0 0 1 1 0 1 0 1 0 1 1 1 0 0 1 1 0 1 1 |
| 12 | 1 1 0 1 1 0 1 0 1 0 0 1 0 1 0 1 1 0 0 0 1 0 0 0 0 1 0 1 0 |
| 13 | 0 1 0 0 1 1 0 1 1 1 0 0 0 1 1 1 1 0 0 1 0 0 1 1 0 0 0 1 |
| 14 | 0 1 1 0 0 0 1 1 1 1 0 0 1 0 0 1 0 1 0 1 0 1 0 1 0 0 1 0 1 |
| 15 | 0 1 1 0 0 1 1 0 1 0 0 1 1 0 1 0 1 1 0 0 0 1 1 0 1 0 1 0 |
| 16 | 1 0 0 0 0 0 1 1 1 1 0 0 1 0 1 1 0 0 1 0 1 0 0 0 1 1 0 0 |
| 17 | 0 0 0 1 1 0 1 0 1 1 0 1 0 0 0 1 1 1 1 1 1 1 0 0 0 1 0 0 1 |
| 18 | 1 0 0 0 1 1 0 1 0 0 1 0 1 0 0 0 1 1 0 1 1 1 1 0 0 0 1 0 0 |
| 19 | 1 0 1 1 1 0 1 1 0 0 1 0 0 1 0 0 1 1 0 0 1 1 1 1 1 1 0 0 |
| 20 | 1 1 1 0 1 0 1 1 0 0 0 1 0 1 1 1 0 1 1 0 1 0 1 1 0 0 |
| 21 | 1 1 0 1 0 1 0 1 0 1 1 0 0 1 1 1 1 0 0 1 1 0 0 0 0 0 1 |
| 22 | 0 1 0 1 0 0 1 1 1 1 1 1 0 0 0 0 1 1 1 1 0 0 1 0 0 0 1 0 |
| 23 | 1 1 0 0 0 0 1 1 0 1 0 1 0 1 1 1 0 0 1 0 1 0 0 1 1 1 0 |
| 24 | 0 1 0 0 1 1 0 1 0 0 1 0 0 1 1 1 0 1 1 1 1 0 0 1 0 1 0 |
| 25 | 0 1 0 1 0 0 1 0 1 0 1 0 1 1 0 0 1 0 0 0 0 1 1 0 1 1 |
| 26 | 0 0 1 1 1 1 0 0 1 1 0 0 0 0 0 1 1 0 1 0 0 1 1 0 0 1 1 |
| 27 | 0 1 1 0 0 0 1 1 0 0 0 1 0 1 0 0 1 0 1 1 0 0 0 0 1 1 |
| 28 | 1 0 1 0 0 0 1 1 0 1 1 1 0 0 1 1 0 0 1 0 1 0 0 0 0 0 0 |
| 29 | 0 1 1 0 0 0 0 1 1 0 1 0 0 1 1 1 1 0 0 0 1 1 1 1 1 0 0 1 |

The PAPR and cross-correlation of the sequence set in Table 9 have the following properties (wherein the cross-correlation is computed based on Eq. (2)):

|  | PAPR | | | XCORR | | |
| --- | --- | --- | --- | --- | --- | --- |
|  | Min | Mean | Max | Min | Mean | Max |
| No FDSS | 2.7133 | 3.2164 | 3.874 | 0 | 0.1267 | 0.3333 |
| With FDSS | 0.7737 | 0.824 | 0.8499 | 0 | 0.17 | 0.3158 |

As a specific exemplary embodiment, when the sequence length is N=18, the sequence set includes at least one of the following sequences:
Sequence 1: b(n)={1 0 0 1 0 1 0 0 1 1 0 0 1 0 1 0 0 1},
Sequence 2: b(n)={1 0 0 0 1 0 0 1 1 1 0 0 0 1 1 0 1 1},
Sequence 3: b(n)={1 0 0 1 0 0 1 0 0 1 1 1 0 1 1 0 1 1},
Sequence 4: b(n)={0 1 1 0 0 1 0 1 0 0 1 1 0 0 1 0 1 0},
Sequence 5: b(n)={1 0 0 1 1 0 0 0 0 1 1 0 0 1 1 1 1},
Sequence 6: b(n)={0 0 1 1 1 1 1 0 0 1 1 0 0 0 0 0 1 1},
Sequence 7: b(n)={0 0 1 1 0 1 0 1 1 0 0 1 1 0 1 0 1 1},
Sequence 8: b(n)={0 1 0 0 0 1 1 1 0 1 1 0 0 0 1 1 1 0},

TABLE 10

Values of $b_u(n)$ for N = 18

| u | $b_u(n)$, n = 0, 1, 2, ..., 17 |
| --- | --- |
| 0 | 0 0 0 0 0 0 1 1 1 1 0 0 1 1 1 0 0 |
| 1 | 0 0 1 0 0 1 1 1 1 0 0 1 1 1 1 0 0 1 |
| 2 | 0 0 1 0 1 0 0 1 1 0 0 1 0 1 0 0 1 1 |
| 3 | 0 0 1 1 0 0 1 0 1 0 0 1 1 0 0 1 1 0 |
| 4 | 0 1 0 0 0 1 1 0 1 0 0 1 0 1 0 1 1 |
| 5 | 0 1 0 0 0 1 1 0 1 1 0 1 1 0 0 0 1 0 |
| 6 | 0 1 0 1 1 0 0 0 1 0 0 1 0 1 1 1 0 0 |
| 7 | 0 1 0 1 1 0 1 0 1 1 0 0 1 1 0 1 1 |
| 8 | 0 1 1 0 0 0 0 1 1 0 1 0 1 1 0 0 0 |
| 9 | 0 1 1 0 0 1 0 1 0 0 1 1 0 0 1 0 1 0 |
| 10 | 0 1 1 0 1 0 1 1 1 0 0 0 0 1 0 0 |
| 11 | 0 1 1 1 0 0 0 1 1 1 1 0 1 1 0 0 |
| 12 | 0 1 1 1 0 1 1 0 1 1 0 0 1 0 0 1 0 |
| 13 | 0 1 1 1 1 0 0 1 0 1 0 0 1 1 1 1 0 |
| 14 | 0 1 1 1 1 0 0 0 1 0 1 1 0 0 1 1 1 0 |
| 15 | 1 0 0 1 0 1 0 0 1 0 0 1 0 1 0 0 1 |
| 16 | 1 0 0 1 0 1 1 0 1 0 0 1 1 1 1 1 0 0 |
| 17 | 1 0 1 0 0 1 1 1 0 0 1 0 0 1 1 1 1 0 |
| 18 | 1 0 1 0 1 0 0 0 0 1 1 0 1 1 0 0 0 1 |

TABLE 10-continued

Values of $b_u(n)$ for N = 18

| u | $b_u(n)$, n = 0, 1, 2, ..., 17 |
|---|---|
| 19 | 1 0 1 1 0 0 1 1 0 1 0 1 1 1 0 0 1 0 |
| 20 | 1 0 1 1 0 1 0 1 1 1 0 0 0 0 1 1 0 |
| 21 | 1 1 0 0 0 0 0 1 1 1 1 0 1 0 0 1 0 |
| 22 | 1 1 0 0 1 0 1 1 0 1 1 0 1 0 0 1 0 1 |
| 23 | 1 1 0 1 0 0 1 1 0 0 1 0 1 1 0 0 0 0 |
| 24 | 1 1 0 1 1 0 1 1 1 0 0 1 0 0 1 0 0 1 |
| 25 | 1 1 0 1 1 1 1 0 0 1 0 1 1 1 0 0 0 0 |
| 26 | 1 1 1 0 0 0 0 1 0 0 1 0 0 0 1 1 1 1 |
| 27 | 1 1 1 0 0 1 0 0 0 1 0 0 1 1 1 0 1 1 0 |
| 28 | 1 1 1 1 0 0 1 0 0 1 0 1 1 0 1 0 0 1 |
| 29 | 1 1 1 1 0 1 1 0 0 0 0 0 0 1 1 0 0 0 |

The PAPR and cross-correlation of the sequence set in Table 10 have the following properties (wherein the cross-correlation is computed based on Eq. (2)):

| | PAPR | | | XCORR | | |
|---|---|---|---|---|---|---|
| | Min | Mean | Max | Min | Mean | Max |
| No FDSS | 0.2351 | 2.9908 | 3.6993 | 0 | 0.1765 | 0.3333 |
| With FDSS | 0.734 | 0.7758 | 0.8001 | 0 | 0.2306 | 0.3967 |

In yet another embodiment, the values of u and $b_u(n)$ for N=18 are shown in Table 11.

TABLE 11

Values of $b_u(n)$ for N = 18

| u | $b_u(n)$, n = 0, 1, 2, ..., 17 |
|---|---|
| 0 | 0 0 0 0 0 1 1 0 1 1 0 1 0 0 1 0 1 1 |
| 1 | 0 0 1 1 0 1 0 1 1 0 0 1 1 0 1 0 1 |
| 2 | 0 0 1 1 1 0 0 0 1 1 1 0 0 0 0 0 1 |
| 3 | 0 0 1 1 1 0 1 1 0 1 0 0 0 1 1 0 1 0 |
| 4 | 0 1 0 0 0 0 1 1 1 1 0 0 1 1 1 1 0 |
| 5 | 0 1 0 0 0 1 0 1 1 1 1 0 0 1 0 1 1 0 |
| 6 | 0 1 0 1 0 1 1 1 1 0 0 1 0 0 1 1 1 0 |
| 7 | 0 1 0 1 1 0 0 1 0 1 1 0 0 0 1 0 0 1 1 |
| 8 | 0 1 0 1 1 1 0 0 0 1 0 1 1 0 0 0 1 0 |
| 9 | 0 1 0 1 1 1 0 0 1 0 1 0 1 1 0 0 0 1 1 |
| 10 | 0 1 1 0 0 0 0 1 1 0 1 0 1 1 0 0 0 1 |
| 11 | 0 1 1 0 1 0 0 1 0 0 1 1 1 0 1 0 1 |
| 12 | 0 1 1 0 1 1 0 0 0 0 1 1 1 1 0 1 1 |
| 13 | 0 1 1 0 1 1 1 0 0 1 0 1 0 0 0 1 1 1 |
| 14 | 0 1 1 1 0 1 0 0 1 0 1 1 0 1 0 1 1 0 |
| 15 | 1 0 0 0 1 0 1 0 1 0 0 1 0 1 0 1 0 |
| 16 | 1 0 0 1 0 0 1 0 0 1 1 1 0 1 1 0 1 1 |
| 17 | 1 0 0 1 0 1 0 0 1 1 0 1 0 1 0 0 0 1 |
| 18 | 1 0 0 1 0 1 1 0 0 0 0 0 0 1 1 1 0 1 |
| 19 | 1 0 1 0 1 0 1 1 0 1 1 0 0 0 0 1 1 1 |
| 20 | 1 0 1 1 0 0 0 0 1 1 1 0 1 0 0 1 1 1 |
| 21 | 1 1 0 0 0 0 0 0 1 0 1 0 1 1 1 1 0 0 |
| 22 | 1 1 0 0 0 0 1 1 1 1 0 1 0 1 0 0 1 0 |
| 23 | 1 1 0 0 0 1 0 1 0 0 1 1 0 1 0 0 1 0 |
| 24 | 1 1 0 1 0 1 1 0 0 1 1 0 1 0 1 1 0 0 |
| 25 | 1 1 0 1 1 0 1 1 1 0 0 1 0 0 0 1 1 |
| 26 | 1 1 1 0 0 1 1 1 1 0 0 0 0 1 0 0 1 |
| 27 | 1 1 1 0 1 0 0 1 1 0 1 1 0 1 0 0 1 0 |
| 28 | 1 1 1 1 0 0 0 1 1 0 0 0 0 0 0 1 1 0 |
| 29 | 1 1 1 1 0 1 1 0 0 0 0 0 0 1 1 0 0 0 |

The PAPR and cross-correlation of the sequence set in Table 11 have the following properties (wherein the cross-correlation is computed based on Eq. (2)):

| | PAPR | | | XCORR | | |
|---|---|---|---|---|---|---|
| | Min | Mean | Max | Min | Mean | Max |
| No FDSS | 2.3510 | 3.1409 | 3.7173 | 0 | 0.1688 | 0.4444 |
| With FDSS | 0.6970 | 0.7738 | 0.8001 | 0 | 0.2354 | 0.4143 |

In yet another embodiment, the values of u and $b_u(n)$ for N=18 are shown in Table 12.

TABLE 12

Values of $b_u(n)$ for N = 18

| u | $b_u(n)$, n = 0, 1, 2, ..., 17 |
|---|---|
| 0 | 1 1 0 1 0 1 1 0 0 1 0 1 1 0 0 0 1 0 |
| 1 | 1 0 0 0 1 0 0 1 0 1 0 1 0 0 1 1 1 1 |
| 2 | 1 0 1 0 1 1 0 0 0 1 1 1 1 0 0 0 1 0 1 |
| 3 | 0 1 0 1 0 0 1 0 1 1 0 1 0 0 1 1 1 0 |
| 4 | 1 0 1 1 0 0 0 0 1 1 1 0 0 1 1 1 1 0 |
| 5 | 0 1 1 0 1 0 1 1 0 1 0 1 1 1 0 0 0 0 |
| 6 | 0 1 1 0 1 0 0 0 0 1 1 1 0 1 1 0 1 |
| 7 | 0 0 0 0 0 1 1 1 0 1 0 1 0 1 1 1 0 0 |
| 8 | 0 1 1 0 1 1 0 0 0 1 0 1 0 0 1 0 1 1 |
| 9 | 1 1 0 0 1 1 0 0 0 0 1 1 0 0 1 1 1 |
| 10 | 0 1 0 0 1 1 1 1 0 0 1 1 0 0 0 0 1 1 |
| 11 | 0 1 1 0 0 0 1 1 1 1 0 0 0 0 0 0 1 |
| 12 | 0 0 1 0 1 0 1 0 1 1 0 1 0 0 0 1 0 1 |
| 13 | 0 1 1 1 1 1 0 0 0 1 0 0 1 1 1 0 0 0 |
| 14 | 0 0 0 0 0 1 1 0 0 0 1 1 1 1 0 1 1 0 |
| 15 | 1 1 0 0 0 0 0 1 1 0 0 1 1 1 1 1 0 0 |
| 16 | 0 0 1 1 0 0 0 0 0 0 1 1 1 1 1 1 1 |
| 17 | 1 1 1 0 1 0 1 1 0 1 0 0 0 0 1 1 1 0 |
| 18 | 1 1 1 0 0 1 1 0 0 0 0 0 1 1 0 0 1 1 |
| 19 | 1 1 1 0 0 1 0 1 1 1 1 1 1 0 0 1 0 0 |
| 20 | 1 0 0 0 0 0 1 1 0 0 1 1 1 1 1 0 0 1 |
| 21 | 0 1 0 0 1 0 0 0 1 1 0 1 0 0 1 1 1 |
| 22 | 0 0 1 0 0 1 1 1 1 1 0 1 0 0 1 0 1 0 |
| 23 | 0 0 0 1 1 0 1 1 1 0 0 0 1 0 0 1 1 1 |
| 24 | 1 0 1 1 0 0 0 1 1 0 1 1 0 0 1 0 1 0 |
| 25 | 0 0 1 0 0 0 1 1 0 1 1 1 0 0 0 0 1 |
| 26 | 0 1 1 0 0 1 0 1 1 0 0 0 1 0 1 1 0 1 |
| 27 | 0 1 1 1 0 0 0 1 1 1 0 0 1 0 1 1 0 0 1 |
| 28 | 0 1 0 1 1 0 0 0 0 0 1 1 0 1 1 1 1 0 |
| 29 | 0 1 0 0 1 1 1 0 1 0 0 1 0 0 1 1 1 0 |

The PAPR and cross-correlation of the sequence set in Table 12 have the following properties (wherein the cross-correlation is computed based on Eq. (2)):

| | PAPR | | | XCORR | | |
|---|---|---|---|---|---|---|
| | Min | Mean | Max | Min | Mean | Max |
| No FDSS | 2.3510 | 3.1525 | 3.7259 | 0 | 0.1785 | 0.3333 |
| With FDSS | 0.6971 | 0.7716 | 0.7979 | 0.0151 | 0.2388 | 0.3967 |

As a specific exemplary embodiment, when the sequence length is N=6, the sequence set includes at least one of the following sequences:
Sequence 1: b(n)={0 0 1 1 1 0},
Sequence 2: b(n)={0 1 1 0 0 1},
Sequence 3: b(n)={0 1 1 1 1 0},
Sequence 4: b(n)={0 0 1 0 0 0},
Sequence 5: b(n)={0 1 0 0 0 1},
Sequence 6: b(n)={0 1 0 1 0 0},
Sequence 7: b(n)={1 0 0 0 0 0},
Sequence 8: b(n)={1 1 0 1 1 0}, or
Sequence 9: b(n)={1 1 1 1 0 1}.
In yet another embodiment, the values of u and $b_u(n)$ for N=6 are shown in Table 13.

TABLE 13

Values of $b_u(n)$ for N = 6

| u | $b_u(n)$, n = 0, 1, 2, 3, 4, 5 | | | | | |
|---|---|---|---|---|---|---|
| 0 | 0 | 0 | 0 | 0 | 0 | 1 |
| 1 | 0 | 0 | 0 | 1 | 0 | 1 |
| 2 | 0 | 0 | 1 | 0 | 0 | 0 |
| 3 | 0 | 0 | 1 | 0 | 1 | 1 |
| 4 | 0 | 0 | 1 | 1 | 0 | 1 |
| 5 | 0 | 0 | 1 | 1 | 1 | 0 |
| 6 | 0 | 1 | 0 | 0 | 0 | 1 |
| 7 | 0 | 1 | 0 | 0 | 1 | 0 |
| 8 | 0 | 1 | 0 | 1 | 0 | 0 |
| 9 | 0 | 1 | 0 | 1 | 1 | 1 |
| 10 | 0 | 1 | 1 | 0 | 0 | 1 |
| 11 | 0 | 1 | 1 | 0 | 1 | 0 |
| 12 | 0 | 1 | 1 | 0 | 1 | 1 |
| 13 | 0 | 1 | 1 | 1 | 1 | 0 |
| 14 | 1 | 0 | 0 | 0 | 0 | 0 |
| 15 | 1 | 0 | 0 | 0 | 1 | 0 |
| 16 | 1 | 0 | 0 | 0 | 1 | 1 |
| 17 | 1 | 0 | 0 | 1 | 1 | 1 |
| 18 | 1 | 0 | 1 | 0 | 0 | 1 |
| 19 | 1 | 0 | 1 | 1 | 0 | 0 |
| 20 | 1 | 0 | 1 | 1 | 1 | 1 |
| 21 | 1 | 1 | 0 | 0 | 0 | 0 |
| 22 | 1 | 1 | 0 | 0 | 1 | 1 |
| 23 | 1 | 1 | 0 | 1 | 0 | 1 |
| 24 | 1 | 1 | 0 | 1 | 1 | 0 |
| 25 | 1 | 1 | 1 | 0 | 0 | 0 |
| 26 | 1 | 1 | 1 | 0 | 0 | 1 |
| 27 | 1 | 1 | 1 | 0 | 1 | 1 |
| 28 | 1 | 1 | 1 | 1 | 0 | 0 |
| 29 | 1 | 1 | 1 | 1 | 0 | 1 |

The PAPR and cross-correlation of the sequence set in Table 13 have the following properties (wherein the cross-correlation is computed based on Eq. (2)):

| | PAPR | | | XCORR | | |
|---|---|---|---|---|---|---|
| | Min | Mean | Max | Min | Mean | Max |
| No FDSS | 1.4916 | 2.7598 | 3.5499 | 0 | 0.2897 | 0.6667 |
| With FDSS | 0.7839 | 1.2026 | 1.5333 | 0 | 0.4065 | 0.7816 |

In yet another embodiment, the values of u and $b_u(n)$ for N=6 are shown in Table 14.

TABLE 14

Values of $b_u(n)$ for N = 6

| u | $b_u(n)$, n = 0, 1, 2, 3, 4, 5 | | | | | |
|---|---|---|---|---|---|---|
| 0 | 0 | 0 | 0 | 0 | 0 | 1 |
| 1 | 0 | 0 | 0 | 0 | 1 | 1 |
| 2 | 0 | 0 | 0 | 1 | 0 | 0 |
| 3 | 0 | 0 | 0 | 1 | 0 | 1 |
| 4 | 0 | 0 | 1 | 0 | 0 | 0 |
| 5 | 0 | 0 | 1 | 0 | 1 | 0 |
| 6 | 0 | 0 | 1 | 0 | 1 | 1 |
| 7 | 0 | 0 | 1 | 1 | 0 | 1 |
| 8 | 0 | 0 | 1 | 1 | 1 | 0 |
| 9 | 0 | 1 | 0 | 0 | 0 | 0 |
| 10 | 0 | 1 | 0 | 0 | 0 | 1 |
| 11 | 0 | 1 | 0 | 1 | 0 | 0 |
| 12 | 0 | 1 | 0 | 1 | 1 | 0 |
| 13 | 0 | 1 | 1 | 0 | 0 | 0 |
| 14 | 0 | 1 | 1 | 0 | 0 | 1 |
| 15 | 0 | 1 | 1 | 0 | 1 | 0 |
| 16 | 0 | 1 | 1 | 0 | 1 | 1 |
| 17 | 0 | 1 | 1 | 1 | 0 | 1 |
| 18 | 0 | 1 | 1 | 1 | 1 | 0 |
| 19 | 1 | 0 | 0 | 0 | 0 | 0 |
| 20 | 1 | 0 | 0 | 0 | 1 | 1 |
| 21 | 1 | 0 | 1 | 0 | 0 | 0 |
| 22 | 1 | 0 | 1 | 1 | 0 | 0 |
| 23 | 1 | 0 | 1 | 1 | 0 | 1 |
| 24 | 1 | 1 | 0 | 0 | 0 | 0 |
| 25 | 1 | 1 | 0 | 0 | 1 | 1 |
| 26 | 1 | 1 | 0 | 1 | 1 | 0 |
| 27 | 1 | 1 | 1 | 0 | 0 | 0 |
| 28 | 1 | 1 | 1 | 0 | 0 | 1 |
| 29 | 1 | 1 | 1 | 1 | 0 | 1 |

The PAPR and cross-correlation of the sequence set in Table 14 have the following properties (wherein the cross-correlation is computed based on Eq. (2)):

| | PAPR | | | XCORR | | |
|---|---|---|---|---|---|---|
| | Min | Mean | Max | Min | Mean | Max |
| No FDSS | 1.4916 | 2.7598 | 3.5499 | 0 | 0.2897 | 0.6667 |
| With FDSS | 0.7839 | 1.2026 | 1.5333 | 0 | 0.4065 | 0.7816 |

The various mappings of u and $b_u(n)$, as shown in the exemplary embodiments above, have been used to provide a further understanding of the disclosed technology. These examples are used to explain the technology rather than limiting its scope.

For example, and in the context of Table 14, when u=0, $b_u(n)$=[0 0 0 0 0 1] and when u=1, $b_u(n)$=[0 0 0 0 1 1]. Alternatively, other embodiments may use $b_u(n)$=[0 0 0 0 1 1] when u=0, and $b_u(n)$=[0 0 0 0 0 1] when u=1.

Exemplary Methods for the Disclosed Technology

Embodiments of the disclosed technology advantageously result in a low peak-to-average ratio, a small cubic metric, and high power amplifier efficiency. In an example, when the sequence index used by the neighboring cells is different, the method further has the effect of reducing inter-cell interference and improving overall system performance.

Figure 2:
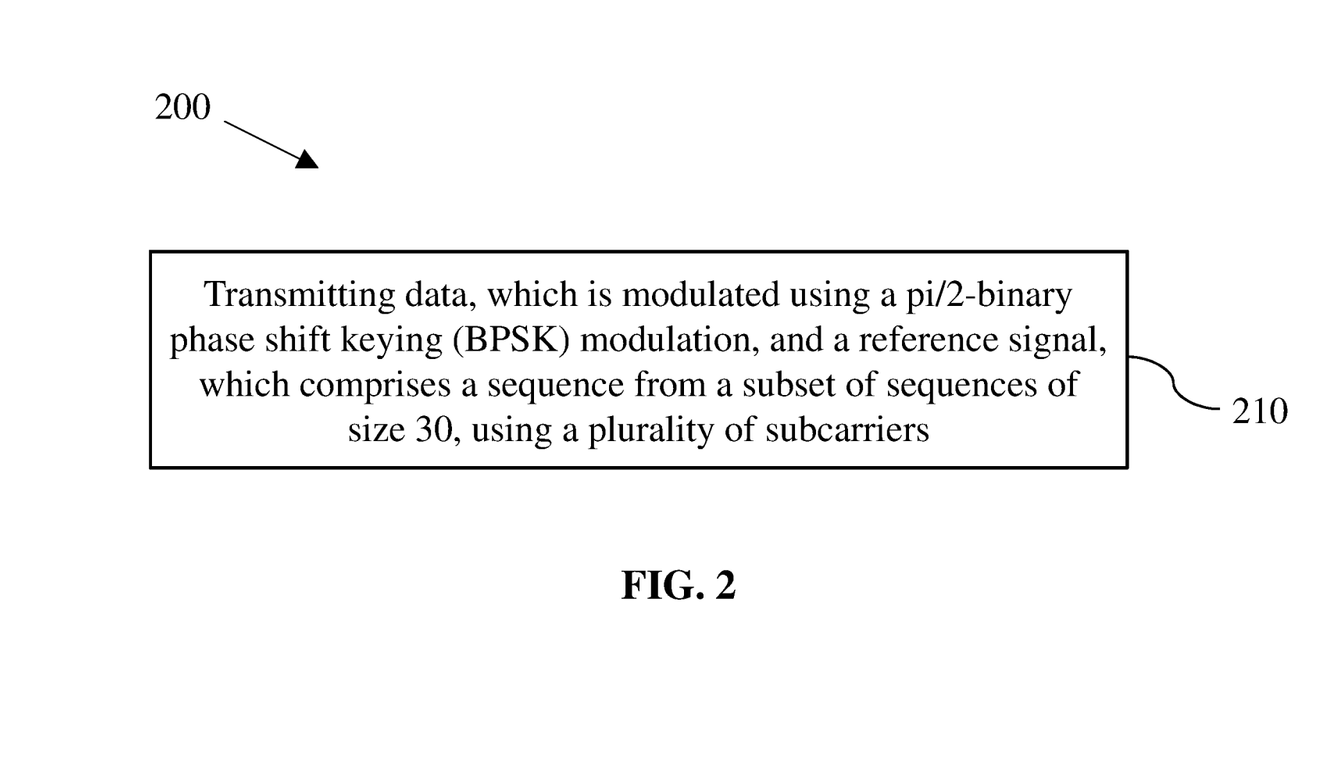
FIG. 2 shows an example of a wireless communication method, in accordance with some embodiments of the presently disclosed technology.

FIG. 2 shows an example of a wireless communication method 200 for generating sequences for reference signals in mobile communication technology. The method 200 includes, at step 210, transmitting data, which is modulated using a pi/2-binary phase shift keying (BPSK) modulation, and a reference signal, which comprises a sequence from a subset of sequences of size 30, using a plurality of subcarriers.

In some embodiments, the subset of sequences contains 30 sequences, each with a predetermined length (e.g., N=6, 12, 18, 24, 30), and include at least a first number of fixed sequences (as denoted in the specific exemplary embodiments in this document) and a second number of selected sequences (to be selected from the tables provided in this document).

In some embodiments, a cross-correlation between a first sequence and a second sequence is less than a threshold.

In some embodiments, the data and the reference signal are transmitted on a physical uplink shared channel (PUSCH) or a physical uplink control channel (PUCCH). In other embodiments, the data comprises uplink traffic data and uplink control information. In yet other embodiments, the reference signal is used to demodulate the data. In one aspect, the sequences described and constructed by embodiments of the disclosed technology advantageously enable improved demodulation performance due to their PAPR and CM correlation properties.

Implementations for the Disclosed Technology

Figure 3:
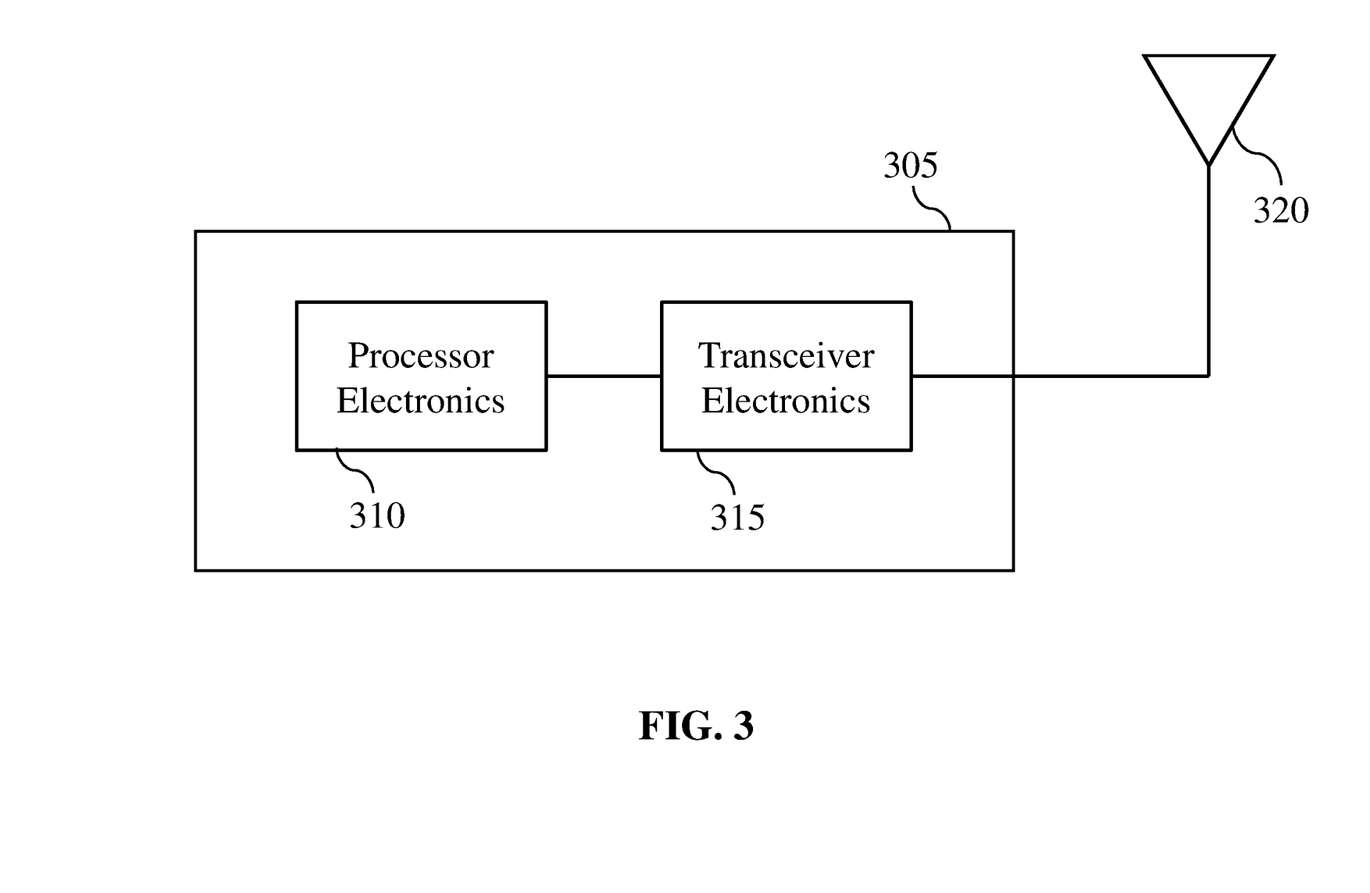
FIG. 3 is a block diagram representation of a portion of an apparatus, in accordance with some embodiments of the presently disclosed technology.

FIG. 3 is a block diagram representation of a portion of an apparatus, in accordance with some embodiments of the presently disclosed technology. An apparatus 305, such as a base station or a wireless device (or UE), can include processor electronics 310 such as a microprocessor that implements one or more of the techniques presented in this document. The apparatus 305 can include transceiver electronics 315 to send and/or receive wireless signals over one or more communication interfaces such as antenna(s) 320. The apparatus 305 can include other communication interfaces for transmitting and receiving data. Apparatus 305 can include one or more memories (not explicitly shown) configured to store information such as data and/or instructions. In some implementations, the processor electronics 310 can include at least a portion of the transceiver electronics 315. In some embodiments, at least some of the disclosed techniques, modules or functions are implemented using the apparatus 305.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
transmitting data and a reference signal using a plurality of subcarriers,
wherein the data is modulated using a pi/2-binary phase shift keying (BPSK) modulation, wherein the reference signal comprises a sequence from a subset of sequences, wherein a size of the subset of sequences is 30, wherein a length of each sequence of the subset of sequences is 24, and wherein the subset of sequences comprises at least one of following sequences:
Sequence 1: $b_1(n)$={0 0 0 1 1 1 1 0 0 1 0 1 0 0 1 1 1 0 1 1 1 0 0 1}, or
Sequence 2: $b_2(n)$={1 1 0 1 0 1 1 1 0 0 1 1 1 0 0 0 0 0 1 1 0 1 0},
wherein $b_u(n)$ is a u-th sequence from the subset of sequences, wherein u=0, 1, . . . 29 is an integer that indexes the sequence in the subset of sequences, and wherein n=0, 1, . . . , 23 is an integer that indexes bits in the sequence,
wherein the sequences include a first sequence and a second sequence,
wherein the first sequence and a second sequence have a cross-correlation that is less than a threshold, and
wherein the sequence from the subset of sequences and corresponding to an index u is given by:

$$d_u(n) = \exp\left(j\frac{\pi}{2}(n \bmod 2)\right)\frac{1}{\sqrt{2}}[(1 - 2b_u(n)) + j(1 - 2b_u(n))].$$

2. The method of claim 1, wherein the subset of sequences comprises the Sequence 1, the Sequence 2, and the following sequence: {1 0 0 1 0 1 0 0 1 1 0 0 0 0 1 1 1 1 1 1 1 0 0 1}.

3. The method of claim 1, wherein the data and the reference signal are transmitted on a physical uplink shared channel (PUSCH) or a physical uplink control channel (PUCCH).

4. The method of claim 1, wherein the data comprises uplink traffic data and uplink control information.

5. The method of claim 1, wherein the reference signal is used to demodulate the data.

6. The method of claim 1, wherein a peak-to-average ratio of each of the sequences does not exceed a value.

7. A method for wireless communication, comprising:
transmitting data and a reference signal using a plurality of subcarriers,
wherein the data is modulated using a pi/2-binary phase shift keying (BPSK) modulation, wherein the reference signal comprises a sequence from a subset of sequences, wherein a size of the subset of sequences is 30, wherein a length of each sequence of the subset of sequences is 18, and wherein the subset of sequences comprises at least one of following sequences:
Sequence 1: $b_1(n)$={0 0 1 1 1 0 1 1 0 1 0 0 0 1 1 0 1 0},
Sequence 2: $b_2(n)$={0 0 0 0 0 1 1 1 0 1 1 0 1 0 1 1 0 0}, or
Sequence 3: $b_3(n)$={0 1 0 0 1 0 0 0 1 1 1 0 1 0 0 1 1 1},
wherein $b_u(n)$ is a u-th sequence from the subset of sequences, wherein u=0, 1, . . . 29 is an integer that indexes the sequence in the subset of sequences, and wherein n=0, 1, . . . , 17 is an integer that indexes bits in the sequence,
wherein the sequences include a first sequence and a second sequence,
wherein the first sequence and a second sequence have a cross-correlation that is less than a threshold, and
wherein the sequence from the subset of sequences and corresponding to an index u is given by:

$$d_u(n) = \exp\left(i\frac{\pi}{ii}(n \bmod 2)\right)\frac{1}{\sqrt{2}}[(1 - 2b_u(n)) + j(1 - 2b_u(n))].$$

8. The method of claim 7, wherein the subset of sequences comprises the Sequence 1, the Sequence 2, the Sequence 3, and the following sequence {1 0 1 1 0 1 0 1 1 1 0 0 0 0 0 1 1 0}.

9. The method of claim 7, wherein the data and the reference signal are transmitted on a physical uplink shared channel (PUSCH) or a physical uplink control channel (PUCCH).

10. The method of claim 7, wherein the data comprises uplink traffic data and uplink control information.

11. The method of claim 7, wherein the reference signal is used to demodulate the data.

12. The method of claim 7, wherein a peak-to-average ratio of each of the sequences does not exceed a value.

13. A method for wireless communication, comprising:
transmitting data and a reference signal using a plurality of subcarriers,
wherein the data is modulated using a pi/2-binary phase shift keying (BPSK) modulation, wherein the reference signal comprises a sequence from a subset of sequences, wherein a size of the subset of sequences is 30, wherein a length of each sequence of the subset of sequences is 12, and wherein the subset of sequences comprises at least following sequence:
Sequence 1: $b_1(n)$={0 0 0 0 0 1 1 0 0 0 1 1},
wherein $b_u(n)$ is a u-th sequence from the subset of sequences, wherein u=0, 1, . . . 29 is an integer that indexes the sequence in the subset of sequences, and wherein n=0, 1, . . . , 11 is an integer that indexes bits in the sequence,
wherein the sequences include a first sequence and a second sequence,
wherein the first sequence and a second sequence have a cross-correlation that is less than a threshold, and
wherein the sequence from the subset of sequences and corresponding to an index u is given by:

$$d_u(n) = \exp\left(j\frac{\pi}{2}(n \bmod 2)\right)\frac{1}{\sqrt{2}}[(1 - 2b_u(n)) + j(1 - 2b_u(n))].$$

14. The method of claim 13, wherein the subset of sequences comprises the Sequence 1, and the following sequence: {0 0 0 0 0 1 1 0 1 1 1 0}.

15. The method of claim 13, wherein the subset of sequences comprises the Sequence 1, and the following sequences: {1 1 0 0 0 0 0 1 1 1 1 0}, and {0 1 0 0 0 1 1 0 1 0 1 1}.

16. The method of claim 13, wherein the data and the reference signal are transmitted on a physical uplink shared channel (PUSCH) or a physical uplink control channel (PUCCH).

17. The method of claim 13, wherein the data comprises uplink traffic data and uplink control information.

18. The method of claim 13, wherein the reference signal is used to demodulate the data.

19. The method of claim 13, wherein a peak-to-average ratio of each of the sequences does not exceed a value.

* * * * *

UNITED STATES PATENT AND TRADEMARK OFFICE
CERTIFICATE OF CORRECTION

PATENT NO. : 11,985,088 B2
APPLICATION NO. : 17/245708
DATED : May 14, 2024
INVENTOR(S) : Chunli Liang et al.

Page 1 of 1

It is certified that error appears in the above-identified patent and that said Letters Patent is hereby corrected as shown below:

In the Specification

In Column 3, Line 23, delete "51," and insert --S1,--
In Column 4, Line 25, delete "$v_{norm}(t)=|v(t)|/rms\ [v(t)]$." and insert --$v_{norm}(t) = |v(t)|/rms[v(t)]$.--
In Column 4, Line 30, delete "mean( )" and insert --mean(·)--
In Column 4, Line 38-39, delete "xcorr_coeffs=abs(sum((seq1.*conj(seq2)))/length(seq1)" and insert
--xcorr_coeffs=abs(sum((seq1.*conj(seq2))))/length(seq1)--
In Column 5, Line 10, delete "10" and insert --1 0--
In Column 5, Line 39, delete "$b_u\ (n)$," and insert --$b_u(n)$,--

In the Claims

In Column 21, Lines 38-39, in Claim 7, delete
" $d_u(n) = \exp\left(j\frac{\pi}{n}(n\ \mathrm{mod}\ 2)\right)\frac{1}{\sqrt{2}}[(1-2b_u(n)) + j(1-2b_u(n))].$ "
and insert --$d_u(n) = \exp\left(j\frac{\pi}{2}(n\ \mathrm{mod}\ 2)\right)\frac{1}{\sqrt{2}}[(1-2b_u(n)) + j(1-2b_u(n))]$ --
In Column 21, Line 43, in Claim 8, delete "sequence" and insert --sequence:--, therefor Signed and Sealed this
Second Day of July, 2024

Katherine Kelly Vidal
*Director of the United States Patent and Trademark Office*